Figure 1:
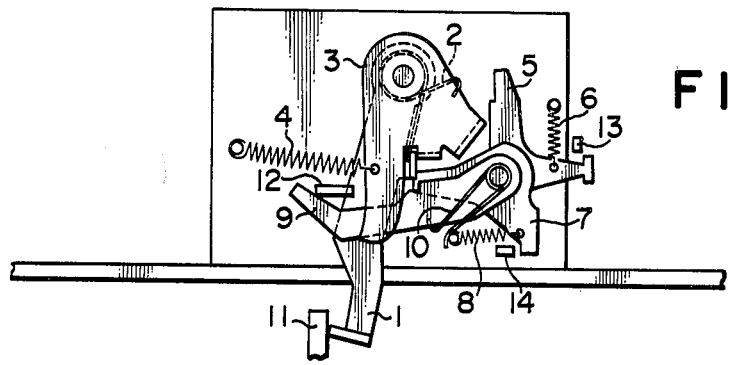

United States Patent [19]

Takeda et al.

[11] 4,223,992
[45] Sep. 23, 1980

[54] RELEASE DEVICE IN A CAMERA EQUIPPED WITH SELF-COCKING MECHANISM

[75] Inventors: Susumu Takeda; Kiyoaki Hazama; Nobuo Ichitsuka, all of Hachioji, Japan

[73] Assignee: Konishiroku Photo Industry Co. Ltd., Tokyo, Japan

[21] Appl. No.: 898,077

[22] Filed: Apr. 20, 1978

[30] Foreign Application Priority Data

Apr. 20, 1977 [JP] Japan ................................. 52-44518

[51] Int. Cl.² ......................... G03B 9/08; G03B 17/42
[52] U.S. Cl. .................................. 354/266; 354/171; 354/204
[58] Field of Search ............................. 354/170–173, 354/204–206, 266–268

[56] References Cited

U.S. PATENT DOCUMENTS 3,903,534  9/1975  Ito ...................................... 354/173

FOREIGN PATENT DOCUMENTS 1079944  4/1960  Fed. Rep. of Germany ........... 354/170

Primary Examiner—L. T. Hix
Assistant Examiner—Shelley Wade
Attorney, Agent, or Firm—Finnegan, Henderson, Farabow, Garrett & Dunner

[57] ABSTRACT

There is disclosed a release device of a camera simple in structure and enabling the camera of "one shot" and successive photographings.

The release device comprises a conventional self-cocking mechanism and a locking and unlocking member in addition. The locking and unlocking member is operated by a member movable in response to film winding operation and actuates a shutter release member to release the release member when the film winding operation is completed.

2 Claims, 4 Drawing Figures

RELEASE DEVICE IN A CAMERA EQUIPPED WITH SELF-COCKING MECHANISM

The present invention relates to a release device of simple structure which enables a self-cocking type camera capable of automatic film-winding by use of a spring motor, electric motor, etc. to effect successive photographing.

In conventional cameras, it is well known that the so-called auto-winding device and auto-drive device have been used as a means to actuate the drive mechanism for automatic film winding, shutter releasing, etc. However no shutter-releasing function is involved in the auto-winding mechanism, while the auto-drive mechanism has such the function in itself. The difference in camera operation is that, in the former case, the camera has only the "single-shot" function. Therefore the depression of the release button on the camera must be conducted for each exposure in order to effect shutter releasing and film winding-up, while, in the latter case, the camera is provided with, in addition to the "one-shot" function the so-called successive exposure function, a function in which, if the release button on the camera is kept depressed, shutter releasing and film winding can be repeated successively. However, the auto-drive mechanism is more complicated in structure than the auto-winding mechanism; hence, a variety of modifications in a camera equipped with the auto-winder has been proposed to make them capable of successive exposure, including the use of an electromagnetic release which controls shutter releasing and film winding by electric signals, or the use of a single-action shutter. However, the former has disadvantages that the camera structure becomes considerably complex and an electric source is needed to actuate the electromagnetic device, while the latter has a problem that the release feels rather heavy in operation when the camera is set in manual winding, although there is no such problem when it is set in automatic winding.

Therefore, an object of the present invention is to provide a release device free from the abovementioned disadvantages.

Another object of the present invention is to provide a release device of simple structure which is capable of successive photographing.

In accordance with the present invention, these objects are attained by a release device of a camera which comprises a controlling member actuating a release-motion actuating member which in turn actuates shutter blades or blinds to effect exposure, a charging member which is operatively connected to a working member reciprocally movable between a first position and a second position in response to film winding operation and is locked in its charged position by a charge-holding member, said controlling member being operatively connected to said charging member to have a potential for allowing the movement of said actuating member and being locked by a first stopping member which is moved in response to a camera release means to release said locked controlling member, comprising a second stopping member for locking said controlling member, said second stopping member being operatively connected to said working member to unlock said controlling member when said working member is in its first position and lock said controlling member when said working member is in positions substantially other than said first position.

The present invention will be described below with reference to the accompanying drawings.

Figure 2:
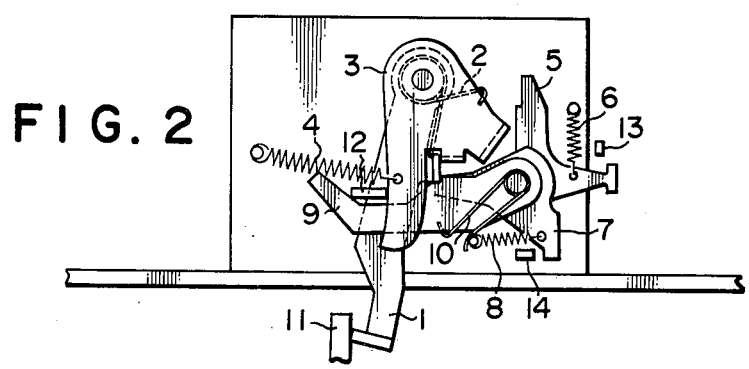
Figure 3:
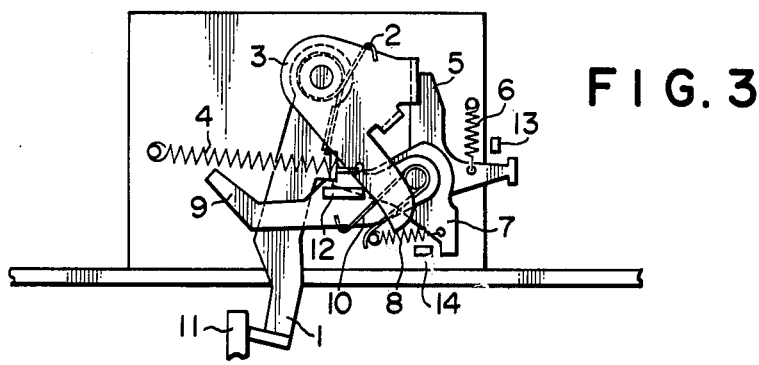
Figure 4:
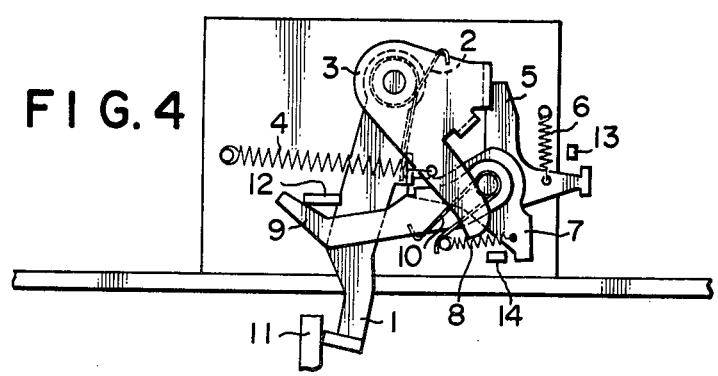

FIGS. 1 to 4 are schematic side views of the release device of the present invention, in which FIG. 1 shows a state before the start of film winding, FIG. 2 the state immediately after the starting of film winding, FIG. 3 the state immediately before the completion of film winding, and FIG. 4 the state after the completion of film winding.

In these drawings, numeral 1 designates a controlling member, numeral 2 a spring means energizing the controlling member and charging member, numeral 3 a charging member, numeral 4 a spring means energizing the charging member, numeral 5 a charge-holding member, numeral 6 a spring means energizing the charge-holding member, numeral 7 a first stopping member, numeral 8 a spring means energizing said stopping member, numeral 9 a second stopping member, numeral 10 a spring means energizing the second stopping member 9, and numeral 11 a release-motion actuating member such as an automatic aperture control lever, whose movement relating to shutter releasing is prevented by the controlling member 1 kept in engagement. The release-mortion actuating member 11 actuates shutter blades or blinds to effect exposure. The release-motion actuating member 11 also actuates a presettable automatic diaphragm mechanism in case of a camera provided with the mechanism. This mechanism is well known as such that exposure aperture are previously set to any aperture value and then upon camera release, diaphragm blades are quickly displaced to provide said set aperture. Numeral 12 designates a working member capable of reciprocating motion (moving to the right in response to the film winding-up operation and returning to the left after the completion of film winding-up operation) and being adapted to effect charging of the charging member 3 and to control engagement and disengagement of the second stopping member 9 with the controlling member 1. Numeral 13 designates a charge-releasing member adapted to press the charge-holding member 5 just before the completion of shutter blade movement (in the case of a shutter other than a focal-plane shutter) or the completion of shutter blind movement (in the case of a focal-plane shutter), or just before the retraction of the sprung-up mirror to its original position in the case of a reflex camera. Concretely, the charge-releasing member 13 is actuated by a lately running shutter blind or a sprung-up mirror displaceably arranged in a finder optical path of a camera. Numeral 14 designates a disengagement member movable to the right by the operation of a shutter-releasing means, for example by the depression of a shutter button, thereby pressing the stopping member 7 to bring it out of engagement with the controlling member 1.

First, the operation of the release device of the present invention will be described below in the case of manual winding, or one shot photographing.

The state where photographing has just been completed by shutter-releasing operation is shown in FIG. 1, in which the working member 12, displaced to the left end, is depressing the second stopping member 9 to keep it out of engagement with the controlling member 1, and the charge-releasing member 13 is held in an elevated position by the completion of shutter blades or shutter blinds or by the retraction of the sprung-up mirror to the original position. The disengagement member 14 is also displaced to the left end, and the stopping member 7, drawn by the spring 8, engages with the controlling member 1. Further, the charging member 3, out of engagement with the charge-holding member 5 and drawn by the spring 4, is pushing the controlling member 1. Thus the controlling member 1, depressed by the charging member 3 and kept in engagement with the first stopping member 7, depresses the release-motion actuating member 11. If the film is wound up, then the working member 12 will move to the right and release its depression upon the second stopping member 9, which in turn moves upward to come into locking engagement with the controlling member 1. This state is shown in FIG. 2, in which the controlling member 1, pressed by the charging member 3, is locked by both the first stopping member 7 and the second stopping member 9. As the film-winding operation progresses further, the working member 12 continues moving to the right to drive the charging member 3 against the forces of spring means 2 and 4 until said charging member 3 comes out of engagement with the controlling member 1 and comes in contact with the charge-holding member 5. This state is illustrated in FIG. 3, in which the film has been almost completely wound up and the charging member 3 is in charged state with the spring means 4 extended, said spring means 4 at the same time energizing the controlling member 1 via the spring means 2. When a wind-stopping mechanism operates upon completion of film winding or when a film-winding knob returns to the wind-starting position, the working member 12 returns to the left end, causing the second stopping member 9 to move downward and come out of engagement with the controlling member 1. This state is shown in FIG. 4. If a shutter-releasing means such as a release button on a camera is operated, then the disengagement member 14 moves to the right, pushing the first stopping member 7 against the force of the spring means 8 to bring it out of engagement with the controlling member 1. As the result, the controlling member 1 moves toward the charging member 3 by the force of the spring means 2, which allows the shutter-releasing member 11 to move rightward whereby shutter blades or blinds operate to effect exposure. Then, when the movement of shutter blades or shutter blinds, or the returning of sprung-up mirror to the original position is just before completion, the charge-releasing member 13 moves downward to push the charge-holding member 5 and brings it out of engagement with the charging member 3. Thus, the charging member 3 returns to the original position as shown in FIG. 1 by the force of the spring means 4 and at the same time pushes the controlling member 1 to its original position as shown in FIG. 1. If, by this time, the operation of the shutter-releasing means has been released, the disengagement member 14 returns to the left, the first stopping member 7 comes again in engagement with the controlling member 1, and the charge-releasing member 13 moves upward upon completion of shutter movement or mirror retraction, with the result that one photographing is completed with all the members of the mechanism completely returned to the original state as shown in FIG. 1.

Next, the action of the release device of the present invention in the case of an automatic winding or successive photographing will be described. In the state of FIG. 1, if the automatic winder is in operation, the film is wound up automatically with a consequent reciprocal movement of the working member 12. When the working member 12 moves to the right, the members of the release device are shifted, through the state of FIG. 2, to the state of FIG. 3. Then a wind-stopping device for the self-cocking mechanism, not shown in the drawings, is actuated to stop the film-winding operation of the automatic winder. At the same time the working member 12 is caused to return to the left end, and the state as shown in FIG. 4 is established if the shutter-releasing means is not in operation. The operation of the shutter-releasing means will, in the same manner as described above with the manual winding, initiate shutter releasing, etc., resulting in the returning of the charging member 3 and the controlling member 1 to their original positions as shown in FIG. 1. Since the stopping action of the wind-stopping device is removed upon initiation of the shutter releasing, etc., the automatic winder again starts winding the film, and stops at the state of FIG. 4 if the shutter-releasing means is not in operation. If the shutter-releasing means is kept in operation until the state of FIG. 4 is established, then the first stopping member 7, kept depressed by the disengagement member 14, remains out of engagement with the controlling member 1. Hence, upon disengagement of the second stopping member 9 out of the controlling member 1 by the returning of the working member 12 to the left after completion of film winding, the shutter-releasing and other related actions are again conducted, thereby permitting successive exposure until the operation of the shutter-releasing means is released.

As apparent from the foregoing, the provision of a simple mechanism of the present invention enables a camera to effect successive exposure in addition to the "single-shot" function.

As mentioned earlier, the release device of the present invention may be applicable to any type of camera equipped with an automatic winder, whether it be a camera with view finder or a reflex camera. In a camera with view finder the charging member 3 is adapted to push and energize the controlling member 1, while in a reflex camera the charging member 3 is adapted, in addition to the above, to energize the mirror for spring-up motion. In a camera with view finder, the controlling member 1 is adapted to depress or release the release-motion actuating member 11 that operates shutter releasing motion, aperture control motion, etc. (said release-motion actuating member may be of an integrated structure or may comprise components each performing respective functions). In a reflex camera which requires a mirror-charging device, the charging member 3 can serve its purpose as well, so that the present invention provides a special advantage in simplifying the mechanism.

In the present invention, the interlocking of the film-winding operation with the movement of the working member 12, the interlocking of shutter or mirror motion with the movement of the charge-releasing member 13, the interlocking of the movement of the shutter-releasing means, such as a shutter button, with that of the disengagement member 14, the film-winding and wind-stopping operations of the automatic winder, etc. can be effected in well-known methods.

What is claimed is:

1. A release device of a camera which comprises a controlling member 1 operable to actuatate a release-motion actuating member 11 which in turn is operable to actuate shutter blades or blinds to effect exposure, a charging member 3 operatively connected to a working member 12 reciprocally movable between a first position and a second position in response to film winding operation and which is locked in its charged position by a charge-holding member 5, means normally biasing said charging member 3 in a direction opposing movement by said working member 12, said controlling member 1 being operatively connected to said charging member 3 and operable to allow movement of said actuating member 11 in response to movement of said charging member 3 by said biasing means, said controlling member 1 being locked by a first stopping member 7 which is moved in response to movement of a disengagement member 14 caused by the shutter release operation to unlock said locked controlling member 1, a charge-releasing member 13 actuated upon completion of exposure and adapted to bring said charge holding member 5 out of engagement with said charging member 3, a second stopping member 9 for locking said controlling member 1, said second stopping member 9 being operatively connected to said working member 12 to unlock said controlling member 1 when said working member 12 is in its first position and lock said controlling member 1 when said working member 12 is in positions substantially other than said first position, whereby after completion of the shutter release operation and while said first stopping member 7 is held displaced from its position locking said controlling member 1 by said disengagement member 14, and after charging of said charging member 3, and when said working member 12 is returned to its first position, the shutter releasing operation can be conducted.

2. A release device according to claim 1 wherein the camera is a single-lens reflex camera provided with a presettable automatic diaphragm control mechanism and a quick return mechanism for spring up a mirror and said control mechanism is operatively connected to said controlling member 1 to displace diaphragm blades to a preset position in response to the displacement of said controlling member 1.

* * * * *